United States Patent [19]
Price, Jr.

[11] Patent Number: 5,967,346
[45] Date of Patent: Oct. 19, 1999

[54] SUPPLEMENTAL STORAGE RACK SYSTEM FOR EXPANSION OF STORAGE CAPACITY OF HIGH DENSITY STORAGE RACK SYSTEM

[75] Inventor: Macy J. Price, Jr., Golden, Colo.

[73] Assignee: Engineered Data Products, Incorporated, Broomfield, Colo.

[21] Appl. No.: 08/844,014

[22] Filed: Apr. 18, 1997

[51] Int. Cl.$^6$ ...................................................... A47F 5/00
[52] U.S. Cl. .......................................... 211/162; 312/201
[58] Field of Search ................................ 211/162, 41.12, 211/189, 208, 88, 103, 190, 192; 312/198, 201, 199, 334.24, 334.25, 334.26, 334.27, 334.28; 104/254, 106, 94, 95, 137, 245, 243

[56] References Cited

U.S. PATENT DOCUMENTS

| | | | |
|---|---|---|---|
| 2,988,012 | 6/1961 | Markley et al. | 211/162 X |
| 3,570,683 | 3/1971 | Dickgiesser | 211/162 |
| 3,923,354 | 12/1975 | Young | 312/198 X |
| 4,615,449 | 10/1986 | Naito et al. | 312/201 X |
| 4,657,317 | 4/1987 | Gemma | 312/198 |
| 4,991,725 | 2/1991 | Welsch et al. | 211/162 |
| 5,062,535 | 11/1991 | Potter . | |
| 5,072,838 | 12/1991 | Price, Jr. et al. | 211/162 |
| 5,160,189 | 11/1992 | Johnston et al. | 312/201 |
| 5,193,696 | 3/1993 | Price, Jr. et al. | 211/162 |
| 5,226,549 | 7/1993 | Price, Jr. et al. | 211/162 |
| 5,265,739 | 11/1993 | Price, Jr. et al. | 211/162 |
| 5,341,944 | 8/1994 | Latino | 211/162 |
| 5,680,942 | 10/1997 | Mcallister et al. | 211/192 |
| 5,735,214 | 4/1998 | Tsuboi . | |
| 5,779,067 | 7/1998 | Reaney | 211/162 X |
| B1 5,265,739 | 8/1995 | Price, Jr. et al. | 211/162 |

FOREIGN PATENT DOCUMENTS

| 34316 | 4/1965 | Finland | 211/162 |
|---|---|---|---|

*Primary Examiner*—Blair M. Johnson
*Attorney, Agent, or Firm*—Flanagan & Flanagan; John R. Flanagan; John K. Flanagan

[57] ABSTRACT

A supplemental storage rack system expanding the storage capacity of a high density storage rack system includes a supplemental rack disposed along and extending parallel to a side rack of the high density storage rack system. The supplemental rack receiving and supporting items. The supplemental storage rack system also includes an upper guide track, upper rollers rotatably mounted to an upper end of the supplemental rack and receiving therebetween the upper guide track for movement of the upper rollers therealong, outrigger support members attached to an upper end of a main rack of the high density storage rack system and extending outwardly therefrom beyond a side of the side rack to support the upper guide track above the upper end of the supplemental rack, a lower auxiliary extension guide track secured to a guide track for the side rack of the high density storage rack system and aligned generally parallel with the upper guide track, and lower rollers rotatably mounted to a lower end of the supplemental rack which movably contact the lower auxiliary extension guide track and thereby movably support the supplemental rack thereon. The lower rollers engage the lower auxiliary extension guide track as the upper rollers engage the upper guide track and thereby permit parallel movement of the supplemental rack along the high density storage rack system.

17 Claims, 10 Drawing Sheets

SUPPLEMENTAL STORAGE RACK SYSTEM FOR EXPANSION OF STORAGE CAPACITY OF HIGH DENSITY STORAGE RACK SYSTEM

BACKGROUND OF THE INVENTION

1. Field of the Invention

The present invention generally relates to storage rack systems for items, such as data storage cartridges and the like and, more particularly, is concerned with a supplemental storage rack system for expansion of the storage capacity of a high density storage rack system for such items.

2. Description of the Prior Art

Large information systems utilizing computers are requiring more and more data storage cartridges. This correspondingly requires more storage area for these cartridges. Since there is typically only a limited amount of physical space in computer room and office facilities allotted to the storage of data cartridges, there is increasing pressure to better utilize the space available for the storage of data storage cartridges.

One approach to augmenting the storage capacity for tape cartridges is to provide racks for retaining tape cartridge storage holders. Tape cartridge holders normally hold a number of tape cartridges for ease of transportation of the cartridges. These tape cartridge holders are then mounted on shelves or vertical support members in the rack until needed.

A further approach to augmenting the storage capacity for tape cartridges within the limited space available is the use of sliding rack systems, such as high density storage rack systems manufactured by Engineered Data Products, Inc. of Broomfield, Colo. Such high density storage rack systems are disclosed in U.S. Pat. Nos. 5,072,838, 5,193,696, 5,226,549 and B1 5,265,739, all of which are assigned to Engineered Data Products, Inc., as is the present invention. In these systems, slidably movable racks are mounted at opposite front and rear sides of stationary racks. This system provides additional storage with only a small amount of increased size.

Notwithstanding the substantial acceptance of these high density storage rack systems in the marketplace, there is a continuing demand for still more innovation to better utilize the available space for the storage of data storage cartridges. Consequently, a need still exists for an improved storage rack system which within the limited physical space available in computer room and office environments will maximize storage capacity for such items as data storage cartridges and the like.

SUMMARY OF THE INVENTION

The present invention provides a supplemental storage rack system which is designed to satisfy the aforementioned need. The supplemental storage rack system of the present invention allows for substantial expansion of the storage capacity of the high density storage rack system without a significant increase in the size of the system. The solution to the physical storage space scarcity problem provided by the supplemental storage rack system is attributable to its compactness in size and capability to retrofit existing high density storage rack systems to expand their storage capacities so as to maximize utilization of the limited physical space available. The supplemental storage rack system of the present invention while intended primarily for use with computer magnetic data tape cartridges can be used with other items, for example audio and/or video tape cartridges, as well.

Accordingly, the present invention is directed to a supplemental storage rack system for expansion of the item storage capacity of a high density storage rack system. The high density storage rack system includes a main rack having upper and lower ends and at least one side for receiving and supporting items, at least one side rack disposed along the one side of the main rack and having upper and lower ends and at least one side for receiving and supporting items and extending generally parallel to the one side of the main rack, and means for movably coupling the upper and lower ends of the side rack to the respective upper and lower ends of the main rack to permit movement of the side rack along the one side of the main rack.

The supplemental storage rack system of the present invention comprises: (a) at least one supplemental rack for disposing along the one side of the side rack of the high density storage rack system and having upper and lower ends and at least one side for receiving and supporting items and extending generally parallel to the one side of the side rack of the high density storage rack system; (b) means for movably coupling the upper end of the supplemental rack to the upper end of the main rack of the high density storage rack system; and (c) means for rollably guiding the lower end of the supplemental rack along the lower end of the side rack of the high density storage rack system such that the movably coupling means and the rollably guiding means cooperate to confine the supplemental rack to substantially parallel movement along and relative to the one side of the side rack of the high density storage rack system.

More particularly, the movably coupling means includes an upper guide track having a top wall and at least one side wall connected to and extending downwardly from the top wall, at least one mounting bracket attached to the upper end of the supplemental rack, at least one pair of upper rollers rotatably mounted to the mounting bracket and receiving therebetween the side wall of the upper guide track for movement of the upper rollers along the side wall of the upper guide track, and at least one outrigger support member for attaching to the upper end of the main rack of the high density storage rack system and extending outwardly therefrom beyond the side of the side rack of the high density storage rack system and attached to the upper wall of the upper guide track to support the upper guide track above the upper end of the supplemental rack. The upper guide track of the movably coupling means further has means in the form of bumper members for stopping movement of the supplemental rack beyond a predetermined point.

Further, the rollably guiding means includes at least one lower auxiliary extension guide track being securable to a guide track for the side rack of the high density storage rack system and aligned generally parallel with the upper guide track, and a plurality of lower rollers rotatably mounted to the lower end of the supplemental rack and movably contacting the lower auxiliary extension guide track and thereby movably supporting the supplemental rack thereon such that the lower rollers engage the lower auxiliary extension guide track as the upper rollers engage the upper guide track and thereby permit parallel movement of the supplemental rack along the high density storage rack system. Also, a plurality of height adjusting members spaced apart along and mounted below the lower auxiliary extension guide track and aligned with a corresponding plurality of openings therethrough to permit adjustment of each of the height adjusting members from above the lower auxiliary extension guide track in order to adjust the lower auxiliary extension guide track and the supplemental rack to a leveled condition on a supporting surface.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
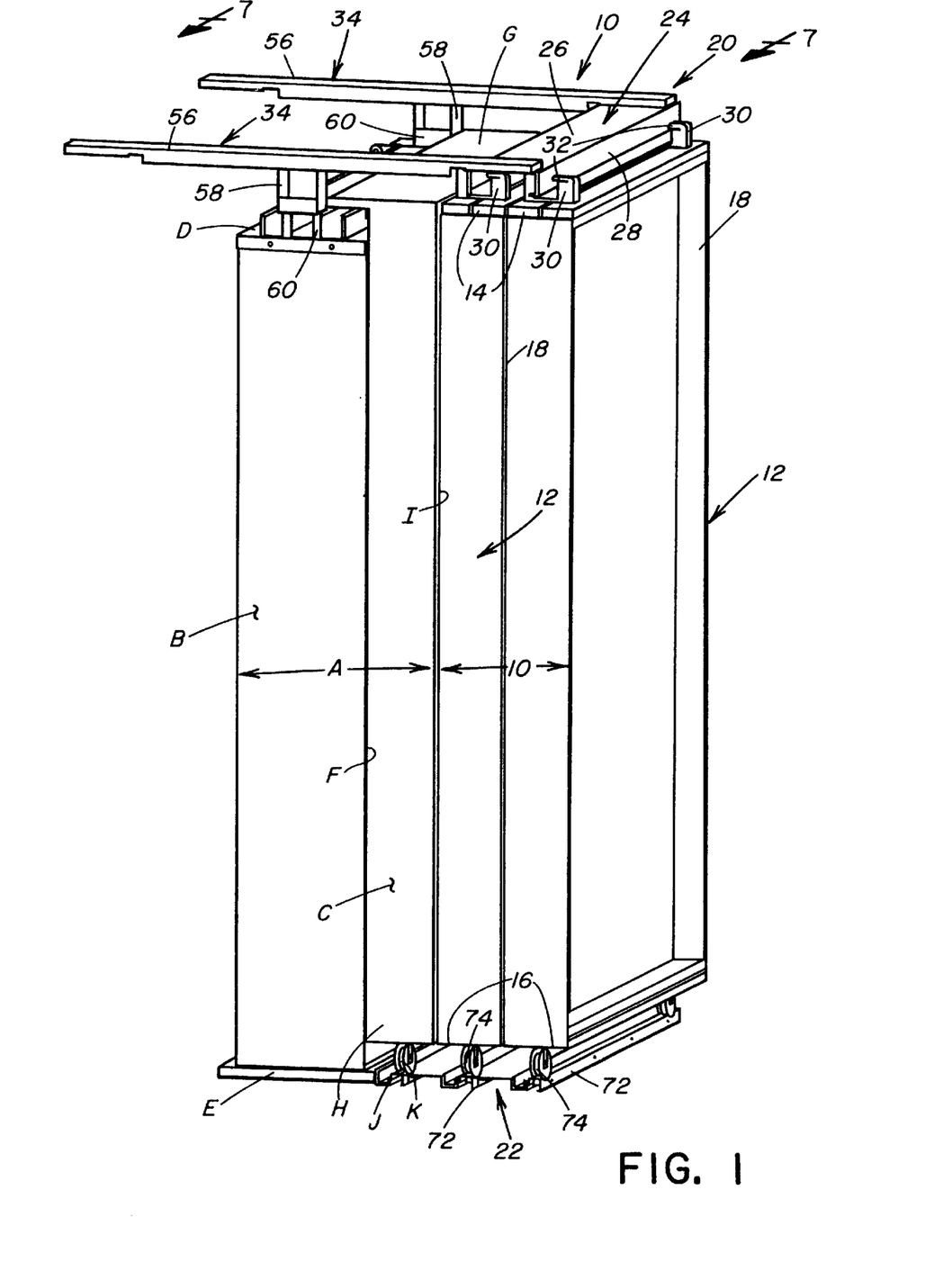
FIG. 1 is a side perspective view of a high density storage rack system retrofitted with a supplemental storage rack system of the present invention.

Referring to the drawings and particularly to FIG. 1, there is illustrated a prior art high density storage rack system A retrofitted with a supplemental storage rack system of the present invention, generally designated 10. The high density storage rack system A and supplemental storage rack system 10 can be used to store various items, such as many generally rectangular-shaped objects, but is primarily intended to store computer magnetic tape cartridges as well as other cartridges. The high density storage rack system A, to which the supplemental storage rack system can be retrofitted, is well-known in the prior art. It should be understood that the supplemental storage rack system 10 of the present invention is not limited to use with the high density storage rack system A for it can be used with other rack systems, as well.

Referring to FIGS. 1–3, 7 and 8, the prior art high density storage rack system A basically includes a main rack B and a side rack C. The main rack B has opposite upper and lower ends D, E and at least one side F for receiving and supporting items (not shown). The side rack C is disposed along the one side F of the main rack B and has upper and lower ends G, H and at least one side I for receiving and supporting items (not shown) and extending generally parallel to the one side F of the main rack B. The high density storage rack system A further includes means in the form of an upper roller guide (not shown) and upper rollers (not shown) for movably coupling the upper end G of the side rack C to the upper end D of the main rack B and means in the form of lower extension guide track J and lower rollers K for movably coupling the lower end H of the side rack C to the lower end E of the main rack B to permit substantially parallel movement of the side rack C along the one side F of the main rack B. The preceding description of the prior art high density storage rack system A has been presented in sufficient detail for one of ordinary skill in the art to gain a thorough and complete understanding of the supplemental storage rack system 10 of the present invention which follows. For brevity, portions of the prior art high density storage rack system A are not shown. For a complete description of the high density storage rack system A in greater detail, attention is directed to U.S. Pat. No. 5,265,739 to Price, Jr. et al., the disclosure of which is incorporated herein by reference thereto.

Referring now to FIGS. 1–11, there is illustrated the supplemental storage rack system 10 of the present invention. The supplemental storage rack system 10 basically includes at least one and preferably a pair of supplemental racks 12 having upper and lower ends 14, 16 and at least one side 18 for receiving and supporting items (not shown). A first or inner one of the supplemental racks 12 is disposed along the one side I of the side rack C of the high density storage rack system A while a second or outer one of the supplemental racks 12 is disposed along the first of the supplemental racks 12. Both supplemental racks 12 extend generally parallel to the one side I of the side rack C of the high density storage rack system A. The supplemental rack storage system 10 also includes means 20 for movably coupling the upper end 14 of each of the supplemental racks 12 to the upper end D of the main rack B of the high density storage rack system A, and means 22 for rollably guiding the lower ends 16 of supplemental racks 12 along the lower end H of the side rack C of the high density storage rack system A. More particularly, the first or inner supplemental rack 12 is rollably guided along the lower end of the side rack C while the second or outer supplemental racks 12 is rollably guided along the lower end 16 of the first or inner supplemental rack 12. The movably coupling means 20 and rollably guiding means 22 cooperate to confine the first or inner supplemental rack 12 to substantially parallel movement along and relative to the one side I of the side rack C and the second or outer supplemental rack 12 to substantially parallel movement along and relative to the one side 18 of the first or inner supplemental rack 12.

Figure 2:
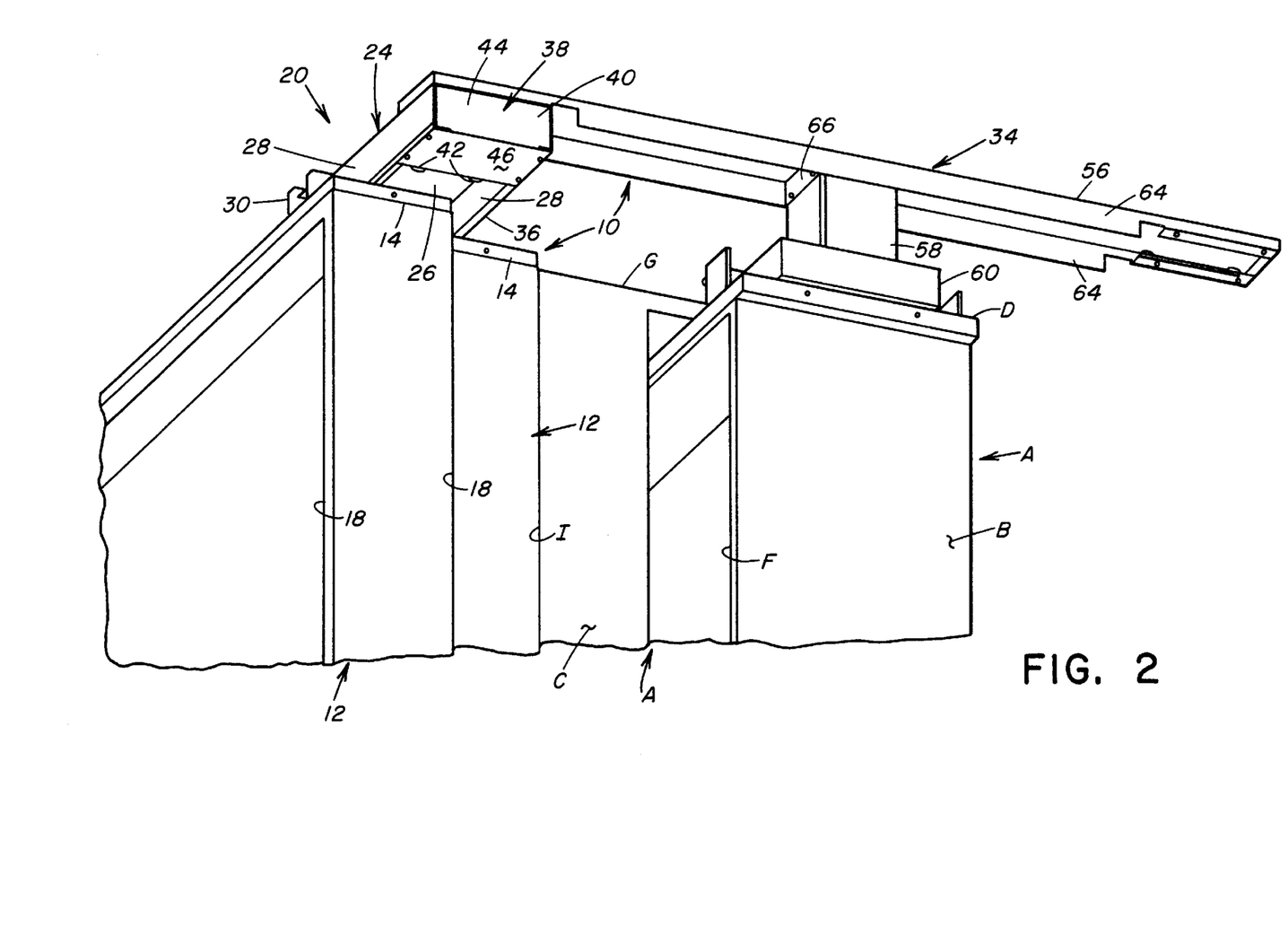
FIG. 2 is an enlarged side perspective view of a portion of the high density storage rack system and the supplemental storage rack system shown in FIG. 1.
Figure 3:
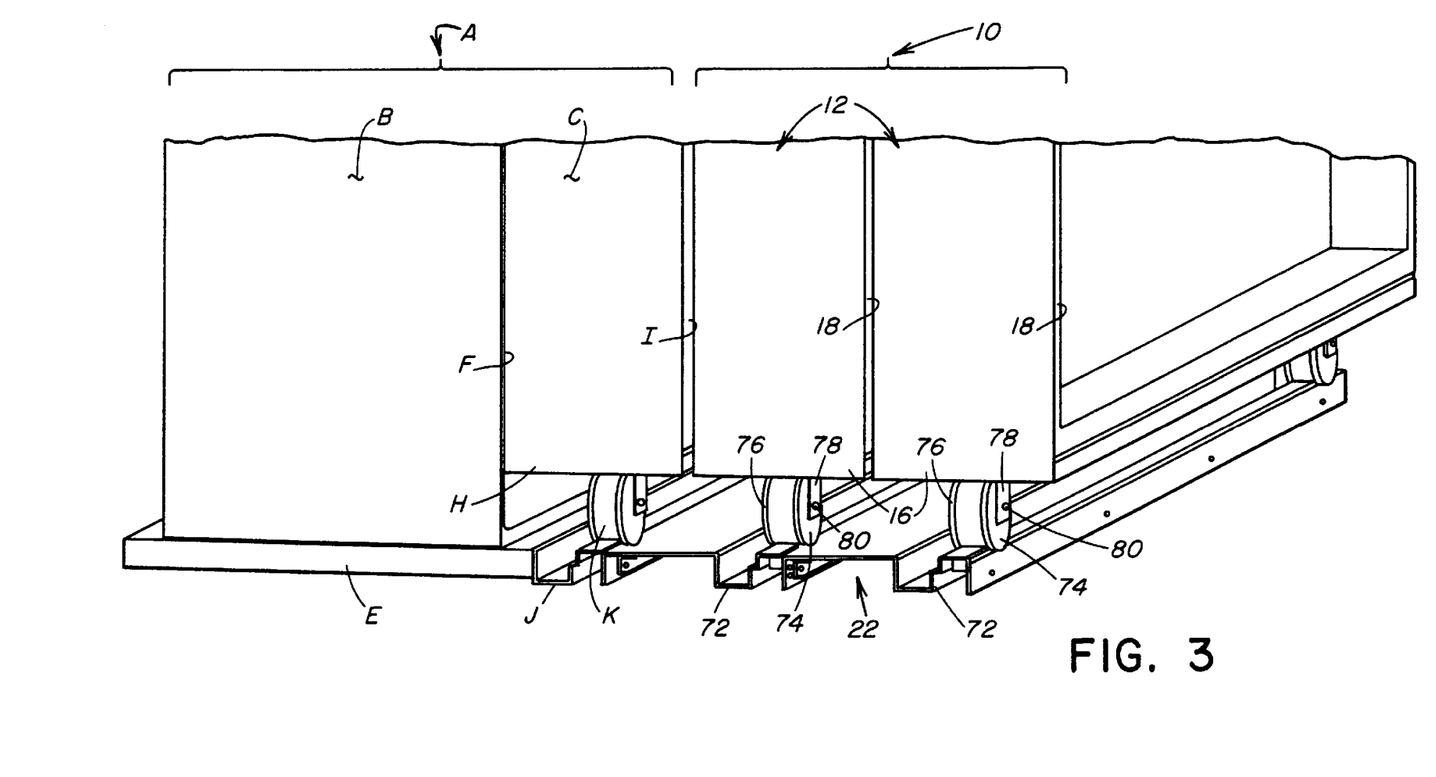
FIG. 3 is an enlarged side perspective view of a portion of the high density storage rack system and the supplemental storage rack system shown in FIG. 1.
Figure 4:
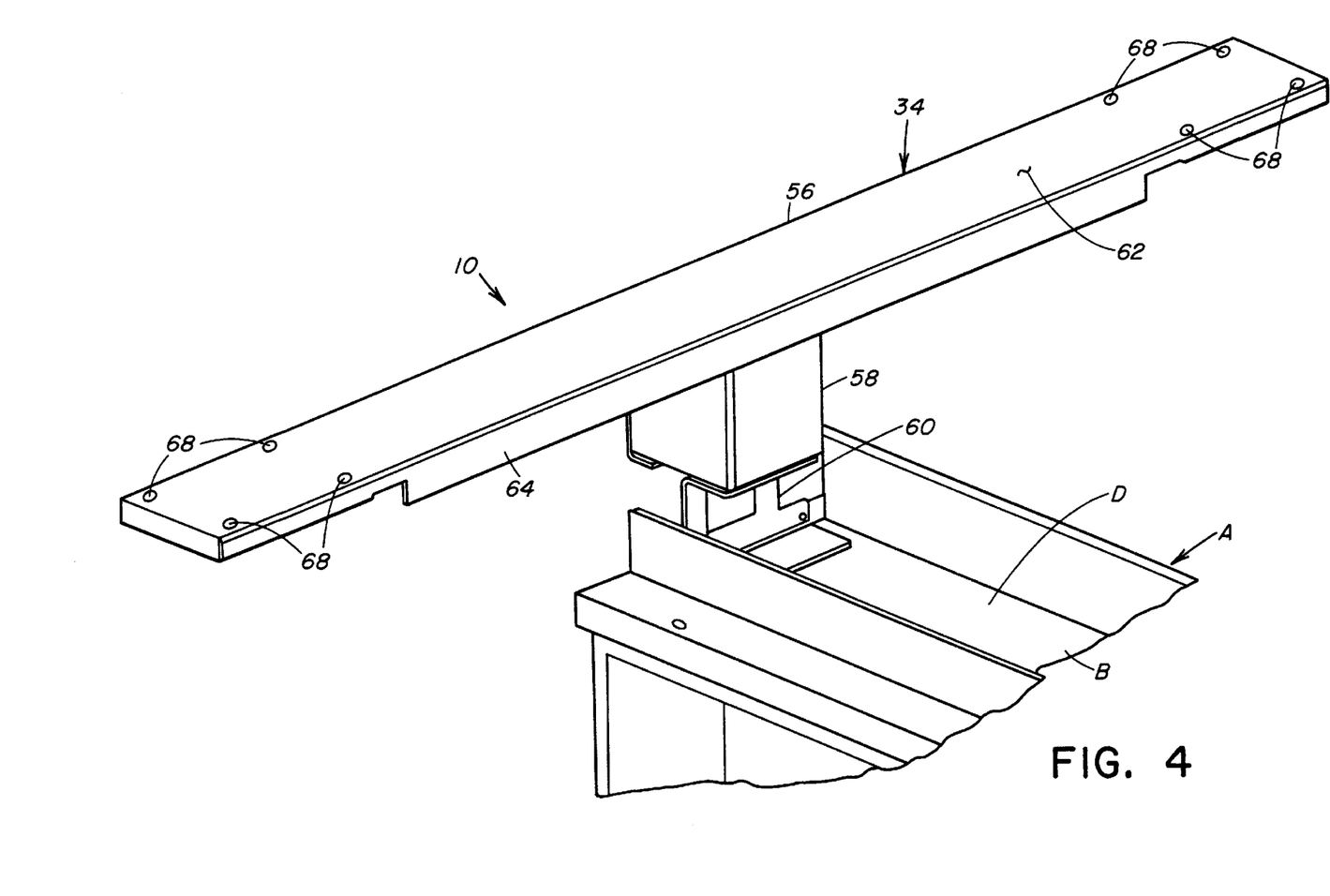
FIG. 4 is an enlarged top perspective view of an outrigger support member of a movably coupling means of the supplemental storage rack system shown attached to an upper end of a main rack of the high density storage rack system.
Figures 5, 6:
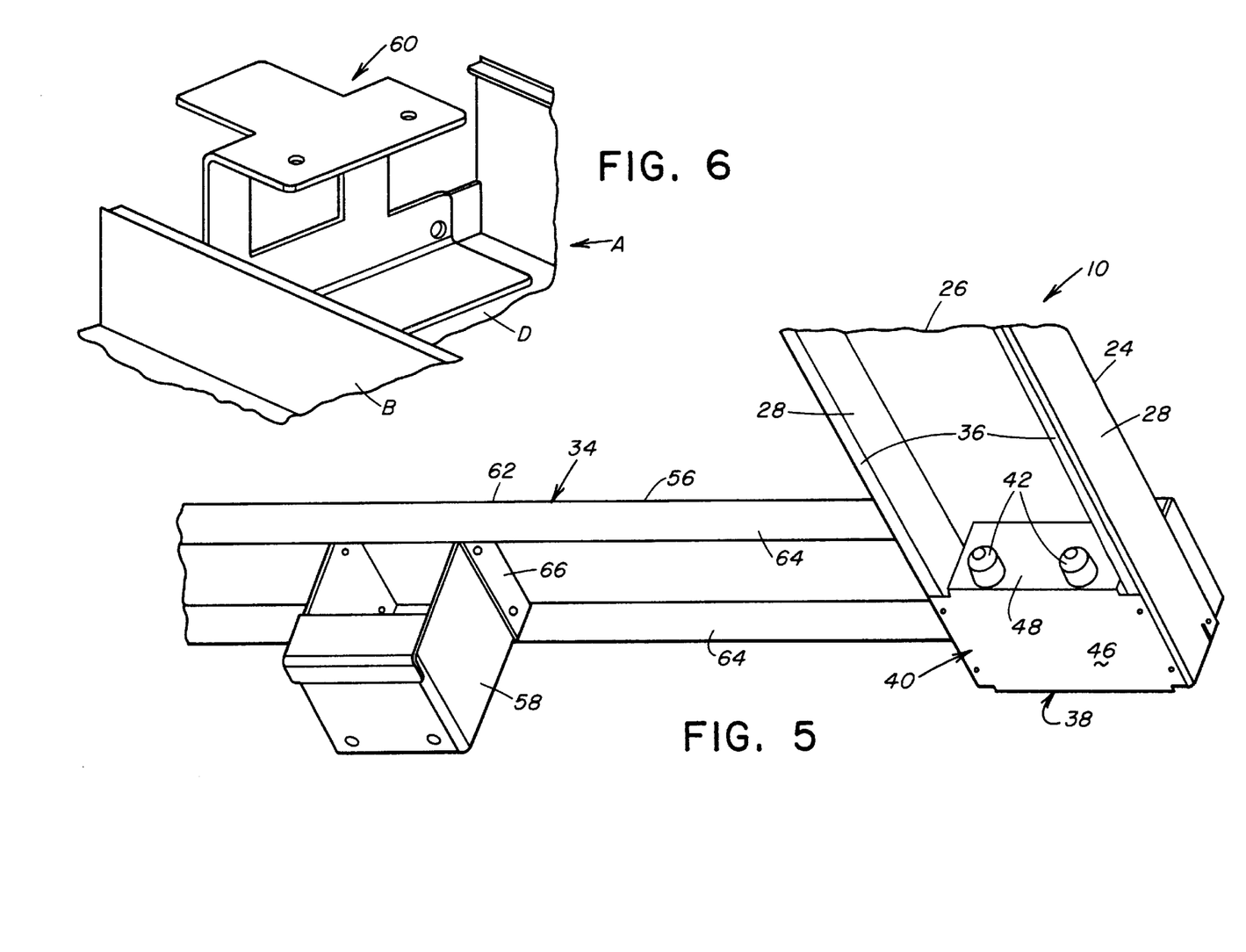
FIG. 5 is an enlarged bottom perspective view of a portion of the outrigger support member and a portion of an upper guide track of the movably coupling means.
FIG. 6 is an enlarged side perspective view of an outrigger support member mounting bracket of the movably coupling means shown attached to the upper end of the main rack of the high density storage rack system.
Figures 7, 8:
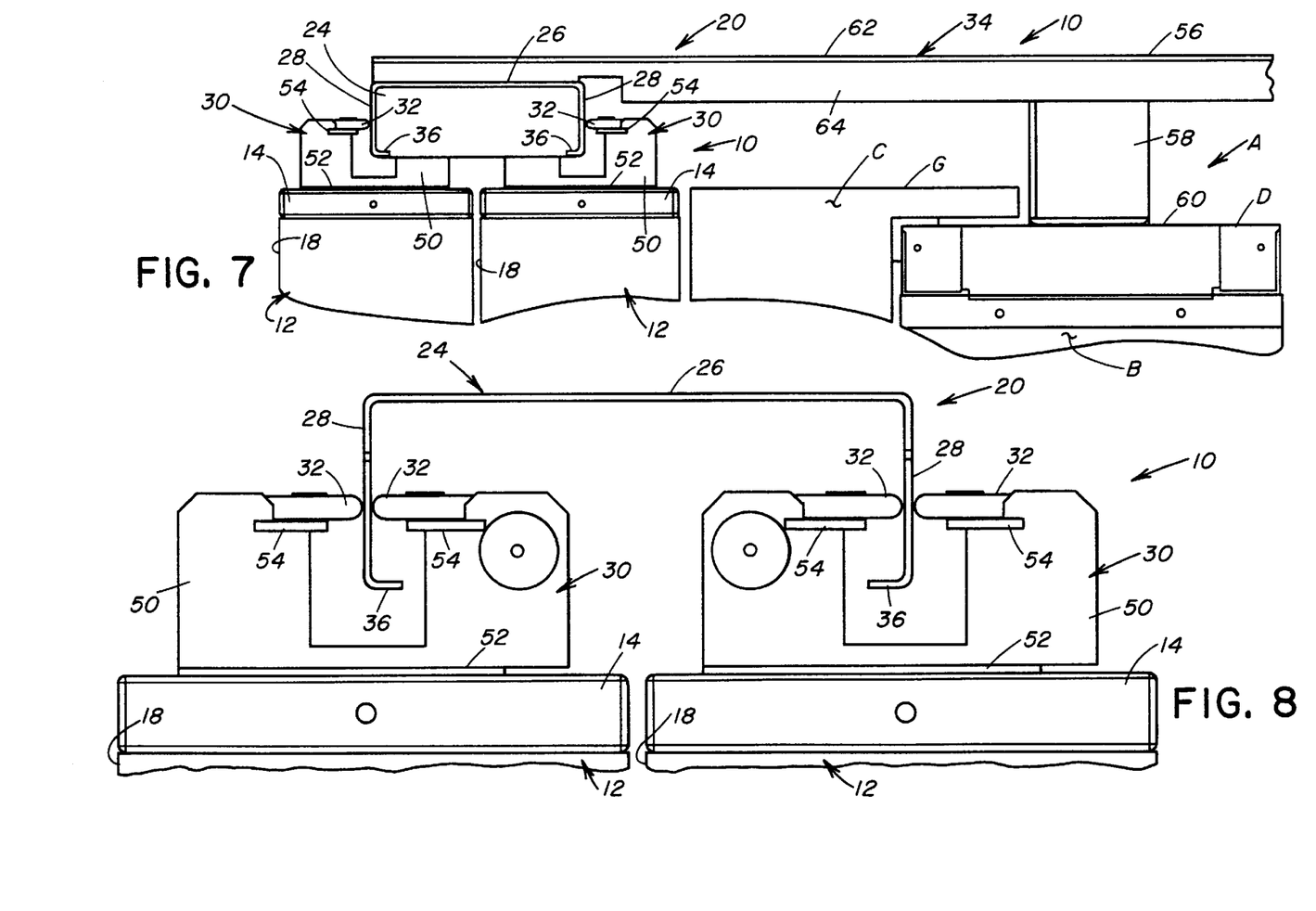
FIG. 7 is an enlarged end elevational view of a portion of the high density storage rack system and the supplemental storage rack system taken along lines 7—7 of FIG. 1.
FIG. 8 is an enlarged partially cross-sectional view of the supplemental storage rack system of FIG. 7.
Figure 9:
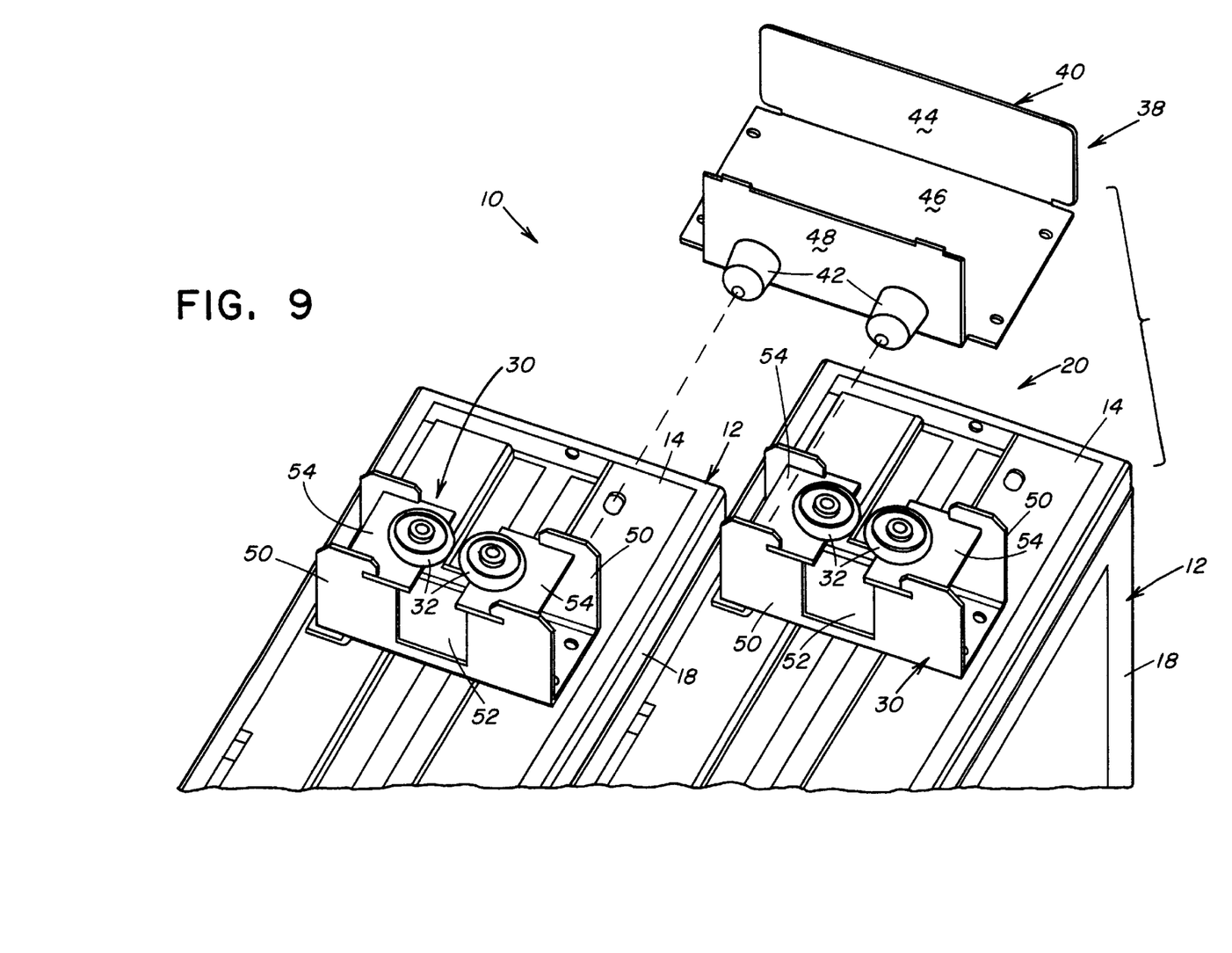
FIG. 9 is an enlarged exploded top perspective view of a portion of the supplemental storage rack system which particularly shows the alignment of a stopping means of the upper guide track of the movably coupling means in relation to a pair of mounting brackets of the movably coupling means.
Figure 10:
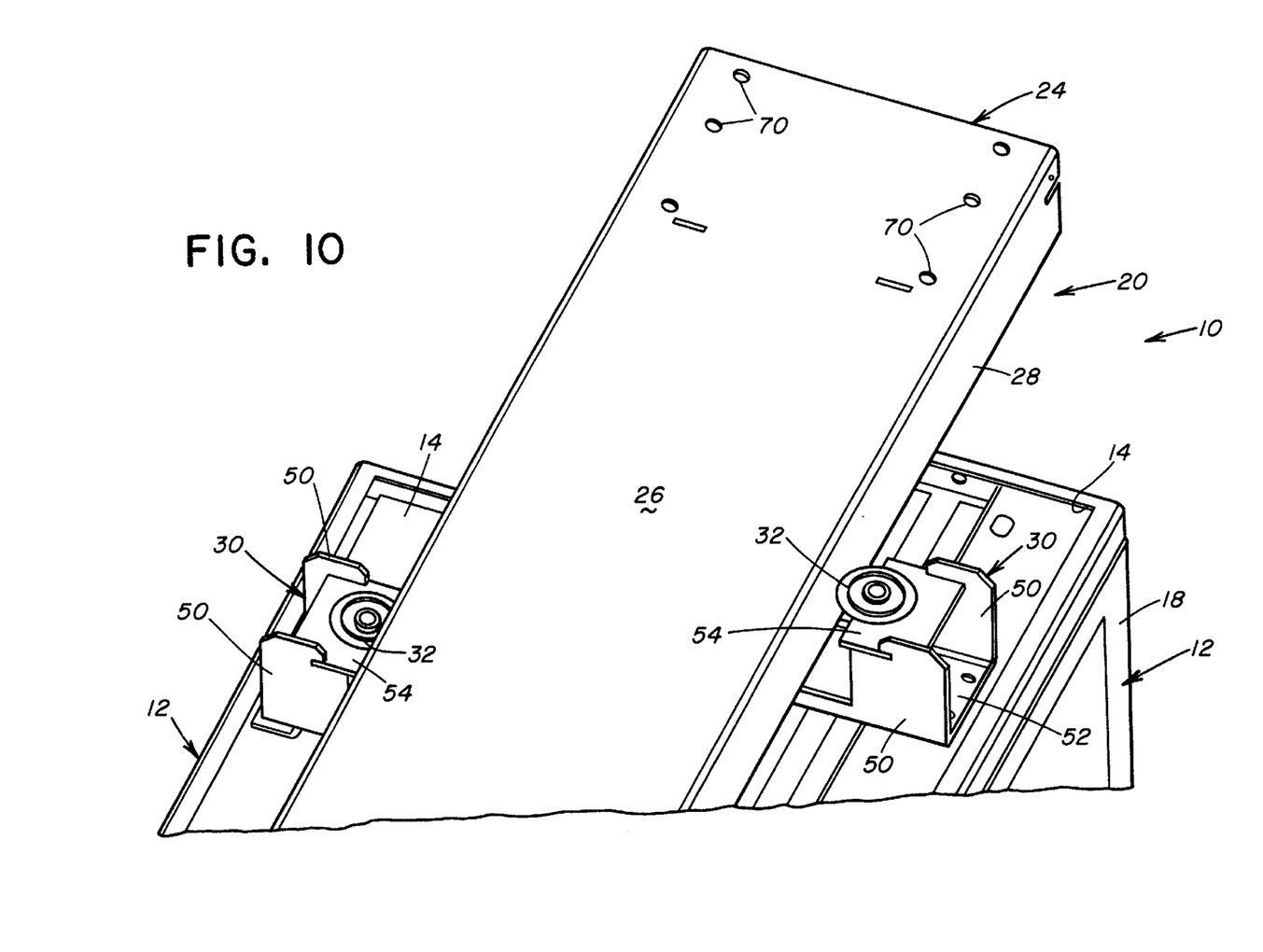
FIG. 10 is an enlarged top perspective view of a portion of the upper guide track of the movably coupling means shown engaged with upper rollers of the movably coupling means.
Figure 11:
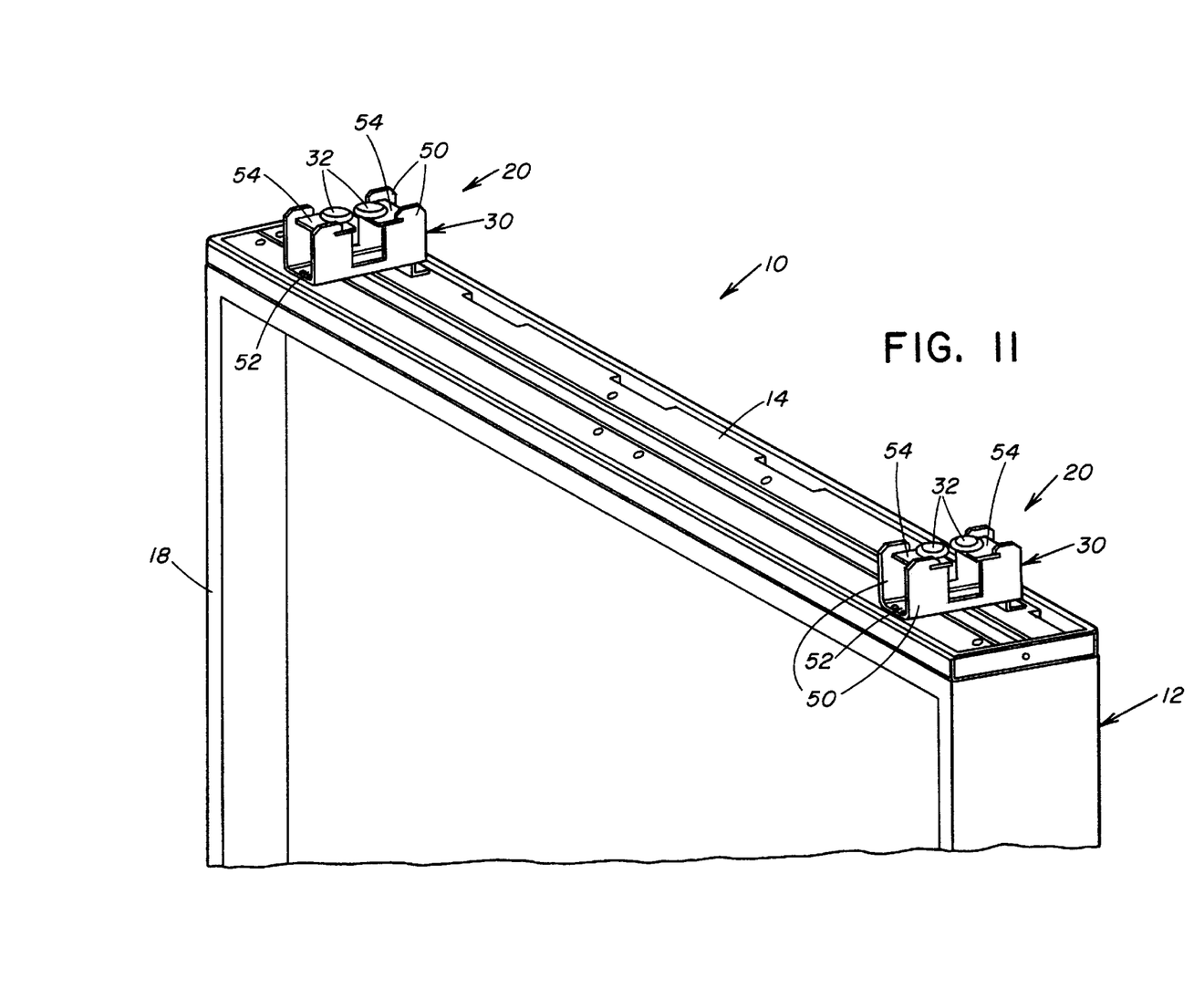
FIG. 11 is an enlarged top perspective view of the upper end of a supplemental storage rack and two pairs of upper rollers mounted to mounting brackets of the movably coupling means attached to the upper end of the supplemental storage rack.

More particularly, each supplemental rack 12 has a substantially rectangular configuration but can have any other suitable shape. Each supplemental rack 12 preferably has a length, width and depth which is substantially the same as that of the side rack C of the high density storage rack system A. The supplemental racks 12 preferably are added singly or as a pair to the high density storage rack system A, as shown in FIGS. 1–3, although the supplemental storage rack system 10 can conceivably include any suitable number of supplemental racks 12. The supplemental racks 12 are generally of a type similar to the movable racks disclosed in U.S. Pat. No. 5,265,739 to Price, Jr. et al., although they are not necessarily so limited in the details of their construction.

The movably coupling means 20 particularly includes an upper guide track 24 having a top wall 26 of substantially planar or flat configuration and at least one and preferably a pair of opposite side walls 28 of substantially planar or flat configuration connected to and extending downwardly from the opposite side edges of the top wall 26, at least one and preferably a plurality of roller mounting brackets 30 attached to the upper end 14 of each of the supplemental racks 12, and at least one and preferably two pairs of upper rollers 32 rotatably mounted to the respective roller mounting brackets 30 and for receiving therebetween respective side walls 28 of the upper guide track 24 for movement of the upper rollers 32 along the respective side walls 28 of the upper guide track 24. The movably coupling means 20 also includes at least one and preferably a pair of outrigger support members 34 extending generally parallel to one another and generally transverse and more specifically perpendicular to the upper ends D and G of the main and side racks B and C of the high density storage rack system A and to the upper end 14 of each supplemental rack 12 and being attached in a cantilevered fashion to the upper end D of the main rack B of the high density storage rack system A and extending outwardly therefrom beyond the side I of the side rack C of the high density storage rack system A and attached to the top wall 26 of the upper guide track 24 to support the upper guide track 24 above the upper ends 14 of the supplemental racks 12.

The upper guide track 24 of the movably coupling means 20 further has at least and preferably a pair of bottom lips 36 of flat configurations respectively connected to and extending perpendicular from the respective lower edges of the side walls 28 and toward the other of the pair of flat bottom lips 36. The bottom lips 36 are provided for preventing pairs of upper rollers 32 from derailing in a downward direction from the upper guide track 24. The bottom lips 36 are spaced between the roller mounting brackets 30. The top wall 26 of the upper guide track 24 also has such horizontal width that the top wall 26 extends a predetermined distance from the center of one of supplemental racks 12 to the center of the other of the supplemental racks 12. The side walls 28 of the upper guide track 24 also have such vertical width that the side walls 28 extend a predetermined distance which disposes the bottom lips 36 below the upper rollers 32 and the top wall 26 above the upper rollers 32.

The upper guide track 24 of the movably coupling means 20 also supports means 38 for stopping movement of the supplemental racks 12 beyond predetermined points. The stopping means 38 of the upper guide track 24 includes a pair of end support brackets 40 and a plurality of bumper members 42. The end support brackets 40 are U-shaped and formed by a flat end wall 44, a flat bottom wall 46 and a flat interior wall 48 which are interconnected to one another and which are each of a substantially rectangular shape and are disposed between and attached to the flat side walls 28 of the upper guide track 24. Each of the plurality of bumper members 42 is mounted to an interior-facing surface of the flat interior wall 48 of one of the pair of end support brackets 40 and protrudes toward another of the bumper members 42 mounted in the same way to the other of the pair of end support brackets 40. Each end support bracket 40 preferably has a pair of the bumper members 42 mounted thereon. Each bumper member 42 is substantially round in shape and comprised of a substantially rigid and only slightly pliable material. The upper guide track 24 generally extends further or has a length greater than as shown in FIG. 1 such that each supplemental rack 12 has room to rollably move relative the side rack C and adjacent supplemental rack 12 so as to provide access to items (not shown) which are received and supported thereon and on the side rack C of the high density storage system A.

Each roller mounting bracket 30 of the movably coupling means 20 has a pair of opposite substantially identical flat U-shaped side walls 50, a flat bottom wall 52 and a pair of opposite flat top plates 54 each being disposed between the flat U-shaped side walls 50. The flat U-shaped side walls 50, flat bottom wall 52 and flat top plates 54 are interconnected to one another. The flat bottom wall 52 is mounted to the upper end of one of the supplemental racks 12. Each of the flat side walls 28 of the upper guide track 24 passes through the flat U-shaped side walls 50 of each roller mounting bracket 30 which is mounted to a particular supplemental rack 12. Each upper roller 32 is rotatably mounted to a flat top plate 54 such that each pair of upper rollers 32 approach one another in the same plane but do not touch and leave enough space between one another for one of the flat side walls 28 of the upper guide track 24 to pass therethrough.

Each outrigger support member 34 of the movably coupling means 20 has an upper elongated horizontal member 56, a middle vertical member 58 and a lower bracket member 60, each attached to one another. The upper elongated horizontal member 56 has a flat top surface 62, a continuous lower side ledge 64 interconnected with and in substantially perpendicular relation to the flat top surface 62 and a pair of lower interior ledges 66 disposed between and interconnected with opposite sides of the continuous lower side ledge 64 and also in substantially perpendicular relation to the flat top surface 62. One or both of the opposite ends of the flat top surface 62 can be attached to the flat top wall 26 of the upper guide track 24 such as by fasteners (not shown) passing through holes 68 defined in the flat top surface 62 and through holes 70 defined in the flat top wall 26 of the upper guide track 24 and which are aligned with the holes 68. The middle vertical member 58 is substantially rectangular in shape and is disposed between and extends below and is attached by any suitable means to the pair of lower interior ledges 66 and is disposed between and extends below opposite sides of the continuous lower side ledge 64. The lower bracket member 60 is substantially C-shaped and is attached to the upper end D of the main rack B of the high density storage rack system A and to the middle vertical member 58 by any suitable means.

Referring to FIGS. 1, 3, 12 and 13, the rollably guiding means 22 particularly includes at least one and preferably a pair of lower auxiliary extension guide tracks 72 being securable to a similar guide track J for the side rack C of the high density storage rack system A, and a plurality of lower rollers 74 rotatably mounted to the lower ends 16 of the supplemental racks 12 and for movably contacting the lower auxiliary extension guide tracks 72. Although not shown in the drawings, there would be another unit of the high density storage rack system A and another length of the lower auxiliary extension guide tracks 72 provided with the ones shown in the drawings so that each of the supplemental racks 12 can be rollably moved through sufficient distances to expose the storages spaces behind the racks 12.

Each lower auxiliary extension guide track 72 is generally upstanding in shape. Each lower roller 74 has outer flanges 76 thereon. The outer flanges 76 of each lower roller 74 prevents the lower roller 74 from becoming misaligned on the lower auxiliary extension guide track 72. A plurality of pairs of spaced apart tabs 78 extend down from and are attached to the lower end 16 of the at least one supplemental rack 12. Each lower roller 74 is disposed between a pair of spaced apart tabs 78 and is rotatably mounted to a pin 80 which is rotatably connected to the pair of spaced apart tabs 78 and thereby rotatably mounts the lower roller 74 to the lower end 16 of the at least one supplemental rack 12. The lower auxiliary extension guide tracks 72 generally extends further than as shown in FIG. 1 such that the supplemental racks 12 have room to roll so as to provide access to items (not shown) which are received and supported thereon and on the side rack C of the high density storage system A. The lower rollers 74 engage the lower auxiliary extension guide tracks 72 as the upper rollers 32 engage the side walls 28 of the upper guide track 24 and thereby permit parallel movement of the supplemental racks 12 along the high density storage rack system A.

Figures 12, 13:
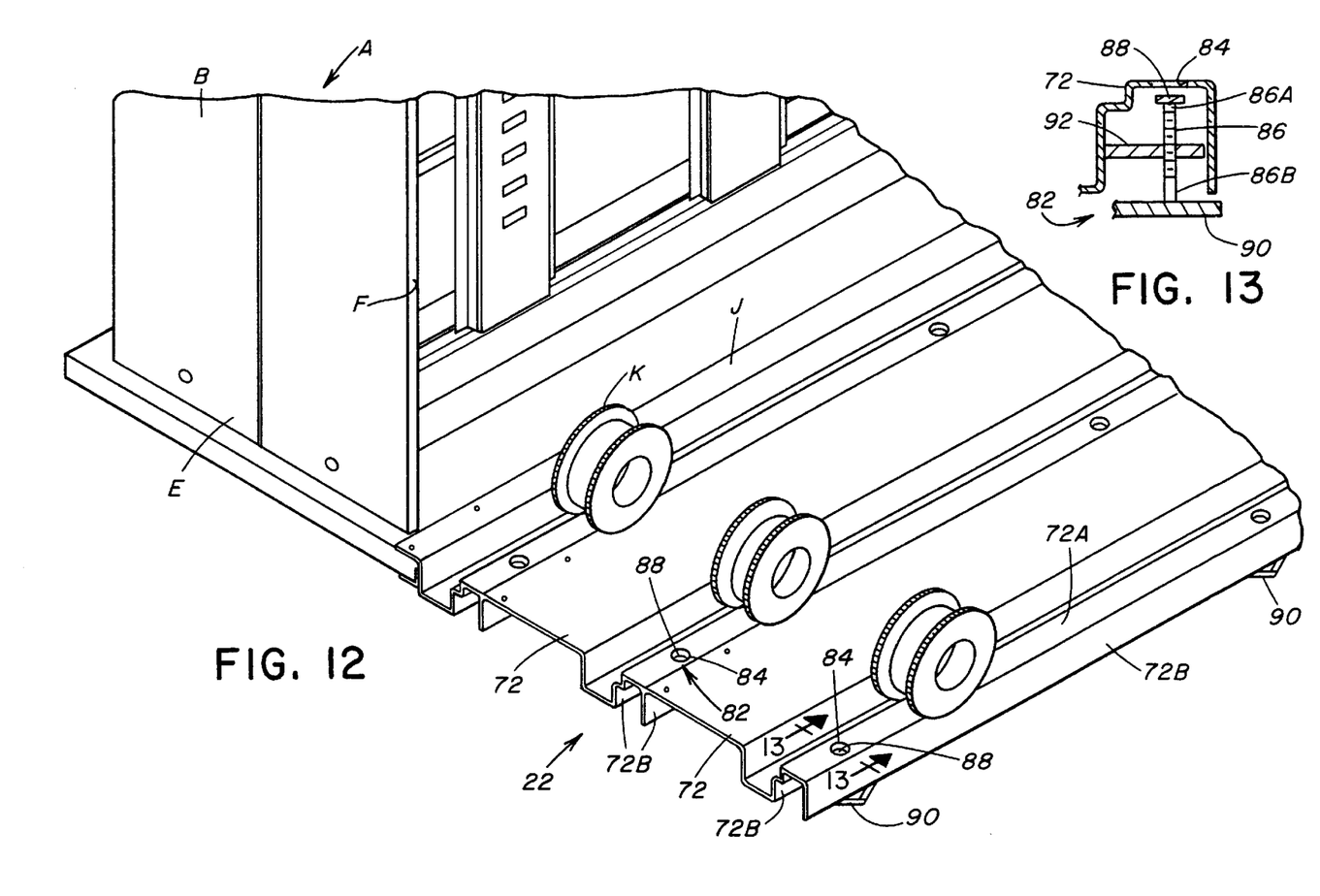
FIG. 12 is an enlarged fragmentary top perspective view of lower auxiliary extension guide tracks supporting the supplemental storage racks and having a plurality of height adjusting members spaced apart along and mounted below each of the lower auxiliary extension guide tracks and aligned with a corresponding plurality of openings therethrough.
FIG. 13 is an enlarged vertical sectional view of one of the height adjusting members taken along line 13—13 of FIG. 12.

Referring now to FIGS. 12 and 13, there is illustrated a plurality of height adjusting members 82 spaced apart along and mounted below each of the lower auxiliary extension guide tracks 72 and aligned with openings 84 formed through a top wall 72A of the guide track 72 to permit adjustment of the height adjusting member 82 from above the top wall 72A of the guide track 72 in order to adjust the supplemental rack 12 to a leveled condition after complete installation. Each height adjusting member 82 includes a threaded stem 86 having a head element 88 attached to its upper end 86A and a base element 90 attached to its lower end 86B and resting on the supporting surface. The head element 88 exposed through the opening 84 can be engaged by a tool extended therethrough to turn the stem 86 and raise or lower the guide track 72. The stem 86 is threaded through an internally threaded bracket 92 fixedly attached to and extending between a pair of spaced upright side walls 92B of the guide track 72.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A supplemental storage rack system for expansion of the item storage capacity of a high density storage rack system including a main rack having upper and lower ends and at least one side for receiving and supporting items, at least one side rack disposed along the one side of the main rack and having upper and lower ends and at least one side for receiving and supporting items and extending generally parallel to the one side of the main rack, and means for movably coupling the upper and lower ends of the side rack to the respective upper and lower ends of the main rack to permit substantially parallel movement of the side rack along the one side of the main rack, said supplemental rack storage system comprising:

(a) at least one supplemental rack for disposing along one side of a side rack of a high density storage rack system and having upper and lower ends and at least one side for receiving and supporting items and extending generally parallel to the one side of the side rack of the high density storage rack system;

(b) means for movably coupling said upper end of said supplemental rack to an upper end of a main rack of the high density storage rack system, said movably coupling means including
   (i) an upper guide track,
   (ii) at least a pair of mounting brackets spaced apart from one another and attached to said upper end of said supplemental rack,
   (iii) a pair of upper rollers rotatable mounted to each of said mounting brackets and receiving therebetween said upper guide track for movement of said upper rollers along said upper guide track, and
   (iv) a pair of outrigger support members for attaching to and spacing apart from one another along the upper end of the main rack of the high density storage rack system and for extending in generally transverse relation to the main rack and side rack and to said supplemental rack and outwardly in a cantilevered fashion from the upper end of the main rack over and beyond the side rack of the high density storage rack system to outer end portions of said outrigger support members being attached to said upper guide track so as to support said upper guide track above said upper end of said supplemental rack; and (c) means for rollably guiding said lower end of said supplemental rack along a lower end of the side rack of the high density storage rack system such that said movably coupling means and said rollably guiding means cooperate to confine said supplemental rack to movement substantially parallel along and relative to the one side of the side rack of the high density storage rack system and to movement substantially transverse and relative to said outrigger support members.

2. The system of claim 1 wherein said upper guide track of said movably coupling means further has means for stopping movement of said supplemental rack beyond a predetermined point.

3. The system of claim 2 wherein said movement stopping means of said upper guide track of said movably coupling means is a pair of end support brackets and at least a pair of bumper members, each of said bumper members being mounted to one of said end support brackets and protruding toward the other of said bumper members mounted to the other of end support brackets.

4. The system of claim 1 wherein said rollably guiding means includes:

at least one lower auxiliary extension guide track being securable to a guide track for the side rack of the high density storage rack system and aligned generally parallel with said upper guide track; and a plurality of lower rollers rotatably mounted to said lower end of said supplemental rack and movably contacting said lower auxiliary extension guide track and thereby movably supporting said supplemental rack thereon such that said lower rollers engage said lower auxiliary extension guide track as said upper rollers engage said upper guide track and thereby permit parallel movement of said supplemental rack along the high density storage rack system.

5. The system of claim 4 further comprising:

a plurality of height adjusting members spaced apart along and mounted below said lower auxiliary extension guide track and aligned with a corresponding plurality of openings therethrough to permit adjustment of each of said height adjusting members from above said lower auxiliary extension guide track in order to adjust said lower auxiliary extension guide track and said supplemental rack to a leveled condition on a supporting surface.

6. A supplemental storage rack system for expansion of the item storage capacity of a high density storage rack system including a main rack having upper and lower ends and at least one side for receiving and supporting items, at least one side rack disposed along the one side of the main rack and having upper and lower ends and at least one side for receiving and supporting items and extending generally parallel to the one side of the main rack, and means for movably coupling the upper and lower ends of the side rack to the respective upper and lower ends of the main rack to permit substantially parallel movement of the side rack along the one side of the main rack, said supplemental rack storage system comprising:

(a) a pair of supplemental racks, a first of said supplemental racks for disposing along one side of a side rack of a high density storage rack system, a second of said supplemental racks for disposing along said first of said supplemental racks, each of said supplemental racks having upper and lower ends and at least one side for receiving and supporting items and extending generally parallel to the one side of the side rack of the high density storage rack system;

(b) means for movably coupling said upper end of each of said supplemental racks to an upper end of a main rack of the high density storage rack system, said movably coupling means including
(i) an upper guide track,
(ii) a plurality of mounting brackets spaced apart from one another and attached to said upper end of each of said supplemental racks,
(iii) a plurality of pairs of upper rollers, each of said pairs of upper rollers being rotatable mounted to one of said mounting brackets and receiving therebetween said upper guide track for movement of said upper rollers along said upper guide track, and
(iv) a plurality of outrigger support members for attaching to and spacing apart from one another along the upper end of the main rack of the high density storage rack system and for extending in generally transverse relation to the main rack and side rack and to said supplemental racks and outwardly in a cantilevered fashion from the upper end of the main rack over and beyond the side rack of the high density storage rack system to outer end portions of said outrigger support members being attached to said upper guide track so as to support said upper guide track above said upper ends of said supplemental racks; and (c) means for rollably guiding said lower end of said first of said supplemental racks along a lower end of the side rack of the high density storage rack system and for rollably guiding said lower end of said second of said supplemental racks along said lower end of said first of said supplemental racks such that said movably coupling means and said rollably guiding means cooperate to confine said first of said supplemental racks to movement substantially parallel along and relative to the one side of the side rack of the high density storage rack system and said second of said supplemental racks to movement substantially parallel along and relative to said one side of said second of said supplemental racks and said first and second supplememental racks to movement substantially transverse and relative to said outrigger support members.

7. The system of claim 6 wherein said upper guide track of said movably coupling means further has means for stopping movement of each of said supplemental racks beyond a predetermined point.

8. The system of claim 7 wherein said movement stopping means of said upper guide track of said movably coupling means is a pair of end support brackets and a plurality of bumper members, each of said bumper members being mounted to one of said end support brackets and protruding toward the other of said bumper members mounted to the other of said end support brackets.

9. The system of claim 6 wherein said rollably guiding means includes:

a pair of lower auxiliary extension guide tracks, a first of said lower auxiliary extension guide tracks being securable to a guide track for the side rack of the high density storage rack system and aligned generally parallel with said upper guide track, a second of said lower auxiliary extension guide tracks being securable to said first of said lower auxiliary extension guide tracks and aligned generally parallel with said upper guide track; and a plurality of lower rollers rotatably mounted to said lower end of each of said supplemental racks and movably contacting a respective one of said first and second lower auxiliary extension guide tracks and thereby movably supporting said respective supplemental racks thereon such that said lower rollers engage with said respective lower auxiliary extension guide tracks as said upper rollers engage said upper guide track and thereby permit parallel movement of said supplemental racks along the high density storage rack system.

10. The system of claim 9 further comprising:

a plurality of height adjusting members spaced apart along and mounted below each of said lower auxiliary extension guide tracks and aligned with a corresponding plurality of openings therethrough to permit adjustment of each of said height adjusting members from above a respective one of said lower auxiliary extension guide tracks in order to adjust said lower auxiliary extension guide track and said supplemental rack to a leveled condition on a supporting surface.

11. In combination with a high density storage rack system including a main rack having upper and lower ends and at least one side for receiving and supporting items, at least one side rack disposed along the one side of the main rack and having upper and lower ends and at least one side for receiving and supporting items and extending generally parallel to the one side of the main rack, and means for movably coupling the upper and lower ends of the side rack to the respective upper and lower ends of the main rack to permit substantially parallel movement of the side rack along the one side of the main rack, a supplemental storage rack system for expansion of the item storage capacity of the high density storage rack system, said supplemental rack storage system comprising:

(a) at least one supplemental rack disposed along the one side of the side rack of the high density storage rack system and having upper and lower ends and at least one side for receiving and supporting items and extending generally parallel to the one side of the side rack of the high density storage rack system;

(b) means for movably coupling said upper end of said supplemental rack to the upper end of the main rack of the high density storage rack system, said movably coupling means including
 (i) an upper guide track,
 (ii) at least a pair of mounting brackets spaced apart from one another and attached to said upper end of said supplemental rack,
 (iii) a pair of upper rollers rotatable mounted to each of said mounting brackets and receiving therebetween said upper guide track for movement of said upper rollers along said upper guide track, and
 (iv) a pair of outrigger support members attached to and spaced apart from one another along the upper end of the main rack of the high density storage rack system and extending in generally transverse relation to the main rack and side rack and to said supplemental rack and outwardly in a cantilevered fashion from the upper end of the main rack over and beyond the side rack of the high density storage rack system to outer end portions of said outrigger support members being attached to said upper guide track to support said upper guide track above said upper end of said supplemental rack; and (c) means for rollably guiding said lower end of said supplemental rack along the lower end of the side rack of the high density storage rack system such that said movably coupling means and said rollably guiding means cooperate to confine said supplemental rack to movment substantially parallel along and relative to the one side of the side rack of the high density storage rack system and to movement substantially transverse and relative to said outrigger support members.

12. The system of claim 11 wherein said upper guide track of said movably coupling means further has means for stopping movement of said supplemental rack beyond a predetermined point.

13. The system of claim 12 wherein said stopping means of said upper guide track of said movably coupling means is a pair of end support brackets and a plurality of bumper members, each of said plurality of bumper members being mounted to one of said end support brackets and protruding toward the other of said bumper members mounted to the other of said end support brackets.

14. The system of claim 11 wherein said rollably guiding means includes:
 at least one lower auxiliary extension guide track being secured to a guide track for the side rack of the high density storage rack system and aligned generally parallel with said upper guide track; and
 a plurality of lower rollers rotatably mounted to said lower end of said supplemental rack and movably contacting said lower auxiliary extension guide track and thereby movably supporting said supplemental rack thereon such that said lower rollers engage said lower auxiliary extension guide track as said upper rollers engage said upper guide track and thereby permit parallel movement of said supplemental rack along the high density storage rack system.

15. The system of claim 14 further comprising:
 a plurality of height adjusting members spaced apart along and mounted below said lower auxiliary extension guide track and aligned with a corresponding plurality of openings therethrough to permit adjustment of each of said height adjusting members from above said lower auxiliary extension guide track in order to adjust said lower auxiliary extension guide track and said supplemental rack to a leveled condition on a supporting surface.

16. In combination with a high density storage rack system including a main rack having upper and lower ends and at least one side for receiving and supporting items, at least one side rack disposed along the one side of the main rack and having upper and lower ends and at least one side for receiving and supporting items and extending generally parallel to the one side of the main rack, and means for movably coupling the upper and lower ends of the side rack to the respective upper and lower ends of the main rack to permit movement of the side rack along the one side of the main rack, a supplemental storage rack system for expansion of the item storage capacity of the high density storage rack system, said supplemental rack storage system comprising:

(a) a pair of supplemental racks, a first of said supplemental racks disposed along the one side of the side rack of the high density storage rack system, a second of said supplemental racks disposed along said first of said supplemental racks, each of said supplemental racks having upper and lower ends and at least one side for receiving and supporting items and extending generally parallel to the one side of the side rack of the high density storage rack system;

(b) means for movably coupling said upper end of each of said supplemental racks to the upper end of the main rack of the high density storage rack system, said movably coupling means including
 (i) an upper guide track having a top wall and a pair of side walls connected to and extending downwardly from opposite edges of said top wall,
 (ii) a plurality of mounting brackets spaced apart for one another and attached to said upper end of each of said supplemental racks,
 (iii) a plurality of pairs of upper rollers, each of said pairs of upper rollers being rotatably mounted to one of said mounting brackets and receiving therebetween said respective side walls of said upper guide track for movement of said upper rollers along said respective side walls of said upper guide track, and
 (iv) a pair of outrigger support members attached to and spaced apart from one another along the upper end of the main rack of the high density storage rack system and extending in generally transverse relation to the main rack and side rack and to said supplemental racks and outwardly in cantilevered fashion from the upper end of the main rack over and beyond the side rack of the high density storage rack system to outer end portions of said outrigger support members being attached to said upper wall of said upper guide track so as to support said upper guide track above said upper ends of said supplemental racks; and (c) means for rollably guiding said lower end of said first of said supplemental racks along the lower end of the side rack of the high density storage rack system and for rollably guiding said lower end of said second of said supplemental racks along said lower end of said first of said supplemental racks such that said movably coupling means and said rollably guiding means cooperate to confine said first of said supplemental racks to movement substantially parallel along and relative to the one side of the side rack of the high density storage rack system and said second of said supplemental racks to movement substantially parallel along and relative to said one side of said second of said supplemental racks and said first and second supplemental racks to movement substantially transverse and relative to said outrigger support members, said rollably guiding means including (i) a pair of lower auxiliary extension guide tracks, a first of said lower auxiliary extension guide tracks being secured to a guide track for the side rack of the high density storage rack system and aligned generally parallel with said upper guide track, a second of said lower auxiliary extension guide tracks being secured to said first of said lower auxiliary extension guide tracks and aligned generally parallel with said upper guide track, and (ii) a plurality of lower rollers rotatably mounted to said lower end of each of said supplemental racks and movably contacting a respective one of said first and second lower auxiliary extension guide tracks and thereby movably supporting said respective supplemental racks thereon such that said lower rollers engage with said respective lower auxiliary extension guide tracks as said upper rollers engage said upper guide track and thereby permit parallel movement of said supplemental racks along the high density storage rack system.

17. The system of claim 16 further comprising:

a plurality of height adjusting members spaced apart along and mounted below each of said lower auxiliary extension guide tracks and aligned with a corresponding plurality of openings therethrough to permit adjustment of each of said height adjusting members from above a respective one of said lower auxiliary extension guide tracks in order to adjust said lower auxiliary extension guide track and said supplemental rack to a leveled condition on a supporting surface.

* * * * *